United States Patent
Iwanami et al.

(10) Patent No.: US 6,830,438 B2
(45) Date of Patent: Dec. 14, 2004

(54) HYBRID COMPRESSOR

(75) Inventors: Shigeki Iwanami, Okazaki (JP); Yukio Ogawa, Kariya (JP); Yoshiki Tada, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/263,654

(22) Filed: Oct. 4, 2002

(65) Prior Publication Data

US 2003/0068232 A1 Apr. 10, 2003

(30) Foreign Application Priority Data

Oct. 9, 2001 (JP) ........................................ 2001-311679

(51) Int. Cl.$^7$ .......................... F04B 49/00; F04B 17/03; F02B 49/00
(52) U.S. Cl. ........................ 417/16; 417/212; 417/374; 62/228.5; 62/230
(58) Field of Search ........................ 417/212, 15, 16, 417/374, 223, 321, 34; 62/230, 229, 228.5, 228.1, 244, 323.3; 165/271, 202, 253, 254

(56) References Cited

U.S. PATENT DOCUMENTS 5,867,996 A * 2/1999 Takano et al. ................. 62/175

6,230,507 B1 * 5/2001 Ban et al. ................... 62/228.4
6,287,081 B1 * 9/2001 Tamegai et al. .............. 417/15
6,375,436 B1 * 4/2002 Irie et al. ..................... 417/223

FOREIGN PATENT DOCUMENTS

| JP | 2000110734 A | * | 4/2000 | ........... F04B/49/06 |
| JP | A-2000-229516 |  | 8/2000 | |
| JP | 2000229516 A | * | 8/2000 | ............ B60H/1/32 |
| JP | 2001132652 A | * | 5/2001 | ........... F04B/49/06 |

* cited by examiner

*Primary Examiner*—Charles G. Freay
(74) *Attorney, Agent, or Firm*—Posz & Bethards, PLC

(57) ABSTRACT

A controlled compressor apparatus enables a hybrid compressor in an idle-stopping vehicle to operate more efficiently when driven by a motor alone. The controlled compressor apparatus includes a compressor 110, included in a refrigeration circuit 200, of a variable volume type for compressing a refrigerant; a motor 120 powered by a battery 12 to operate; and a controller 130 for selecting the driving force provided either by the engine 10 or the motor 120 to drive the compressor 110 and control its discharge volume. The controller 130 causes the motor 120 to operate the compressor 110 such that the compressor 110 is turned on or off at a discharge volume of the compressor 110 that larger within a variable range than that required for operating the refrigeration circuit 200.

20 Claims, 4 Drawing Sheets

HYBRID COMPRESSOR

CROSS REFERENCES TO RELATED APPLICATIONS

This application relates to and incorporates by reference Japanese patent application no. 2001-311679, which was filed on Oct. 9, 2001.

BACKGROUND OF THE INVENTION

The present invention relates to a controlled compressor apparatus that is preferably used for an air-conditioning system or a refrigeration circuit in a so-called idle-stop vehicle, the engine of which is stopped while the vehicle is temporarily at rest.

For example, known is a conventional controlled compressor apparatus (a hybrid compressor), as disclosed in Japanese Patent Laid-Open Publication No. 2000-229,516, in which an engine or a motor selectively operates a compressor and a refrigeration circuit.

This controlled compressor apparatus operates the compressor via an electromagnetic clutch (by engaging the electromagnetic clutch) while the engine is in operation, whereas, when the engine is at rest, the compressor is driven by a battery-powered motor, with the electromagnetic clutch disengaged.

In this case, control is provided as described below based on the idea that the compressor should operate at a minimum necessary level, since operating the compressor by the motor results in a large amount of power being consumed. That is, the compressor is a swash-plate variable-volume compressor. First, when the discharge volume of the compressor is larger than a predetermined value when it is predicted that the engine will stop, the electromagnetic clutch is turned off after a delay, to further increase the discharge volume. This allows the engine to drive the compressor continuously to lower the cooling temperature. Next, the discharge volume is reduced and the compressor is operated by both the motor and the engine. Thereafter, the electromagnetic clutch is disengaged and the engine is shut down, allowing the compressor to be driven by the motor alone. At this time, the discharge volume is varied according to the required cooling capability.

This arrangement provides reduced power consumption at the time of starting the motor and allows the engine to continuously operate to provide sub-cooling prior to stopping the engine, thereby reducing the power consumption of the motor when the engine is at rest. Furthermore, the discharge volume of the compressor is varied to be consistent with the required cooling capability of the refrigeration circuit, thereby reducing the power consumption of the motor.

However, since the operation of the engine is halted after a delay, to provide sub-cooling prior to stopping the engine, the engine is operated for a longer period of time, which undermines the goal of decreasing fuel consumption.

On the other hand, when the discharge volume is dropped for a lower required cooling capability, the compressor efficiency is reduced accordingly. This makes it impossible to reduce the power consumption of the compressor in proportion to the required cooling capability, and thus the motor consumes more power than should be necessary.

That is, the required cooling capability Q is proportional to the discharge volume V. Generally, in a compressor of a variable-volume type, the rate of effect of various losses (such as a leakage loss at the time of compression or a mechanical loss at the bearings or seals) in the compressor corresponding to the required power consumption L increases as the discharge volume V is dropped. Thus, as shown in FIG. 6, the compressor efficiency $\eta c$ is decreased.

On the other hand, the actual coefficient of performance (the actual COP) in the refrigeration circuit is expressed as shown by equation 1, and thus the power consumption L of the compressor is expressed by equation 2.

Actual COP=$Q/L$=$\eta c \cdot$theoretical COP      Equation 1

$L=Q/(\eta c \cdot$theoretical COP)      Equation 2 where the theoretical COP is a theoretical coefficient of performance in the refrigeration circuit.

As can be seen from equation 2, the required cooling capability Q and the power consumption L are not proportional to each other due to a drop in compressor efficiency $\eta c$. For example, even with the required cooling capability Q being halved (and the discharge volume V also being halved), the power consumption L is not halved due to a corresponding degradation in compressor efficiency $\eta c$. It instead becomes larger than it should, thereby causing the motor to consume power unnecessarily by that amount.

In view of the aforementioned problems, an object of the present invention is to provide a controlled compressor apparatus that enables a compressor to provide an increased operating efficiency when driven by a motor alone and thereby reduces power consumption while maintaining an improved fuel efficiency resulting from stopping the engine.

SUMMARY OF THE INVENTION

To achieve the aforementioned object, the present invention is essentially a compressor apparatus that is applied to a vehicle having an engine. The engine stopped when the vehicle is at rest while running. The compressor apparatus includes a compressor, which is included in a refrigeration circuit, of a variable volume type for compressing a refrigerant; a motor powered by a battery to operate; and a switching mechanism for switching between the engine or the motor to drive the compressor. The compressor apparatus further includes a controller for selecting either the engine or the motor to drive the compressor and for controlling a discharge volume of the compressor. The controller selectively operates the motor to operate the compressor when the engine is at rest. The controller causes the motor to operate the compressor such that the compressor is turned on or off at a discharge volume of the compressor that is greater, within a variable range, than that continuously required for operating the refrigeration circuit.

This allows the compressor to be operated by means of the motor alone while engine is at rest, which ensures an originally intended idle-stop operation to improve fuel efficiency.

Furthermore, when a low cooling capability is required, the compressor is allowed to operate without reducing the compressor efficiency ($\eta c$), which reduces the power consumption of the motor. At this time, the turning on and off operations can eliminate redundant operating time, which reduces the total power consumption.

According to another aspect, the turning on and off operations of the motor are carried out in accordance with any of temperatures at an evaporator included in the refrigeration circuit, at an air inlet through which air cooled down by the evaporator is discharged into a cabin of the vehicle, inside the cabin, and outside the vehicle.

This makes it possible to readily control the turning on and off operations using also a temperature signal provided by a temperature sensor portion that is typically provided in the refrigeration circuit. At this time, it is possible to maintain the minimum required cooling capability to provide cooling while the engine is at rest, reducing the power consumption of the motor.

According to another aspect of the invention, while the engine is operating the compressor, the controller varies the discharge volume of the compressor to be consistent with a discharge volume required for operating the refrigeration circuit.

This makes it possible to make use of the original merits of the compressor of a variable volume type in eliminating shocks, occurring when the discharge volume is varied, to keep a good drive feeling provided while the vehicle is running. That is, while the vehicle is running, the engine drives the compressor regardless of the motor, thereby eliminating the need for worrying about power consumption. In general, high transmission efficiencies are achieved when a drive force is transmitted from the engine to the compressor. Thus, it is much more advantageous to make use of the original merits of the variable volume compressor than to consider the compressor efficiency (ηc) of the compressor alone.

According to another aspect of the invention, it is preferable that the compressor is integrated with the motor and is employed as a hybrid compressor selectively driven by either the engine or the motor.

DETAILED DESCRIPTION OF THE PREFERRED EMBODIMENTS

First Embodiment

Figure 1:
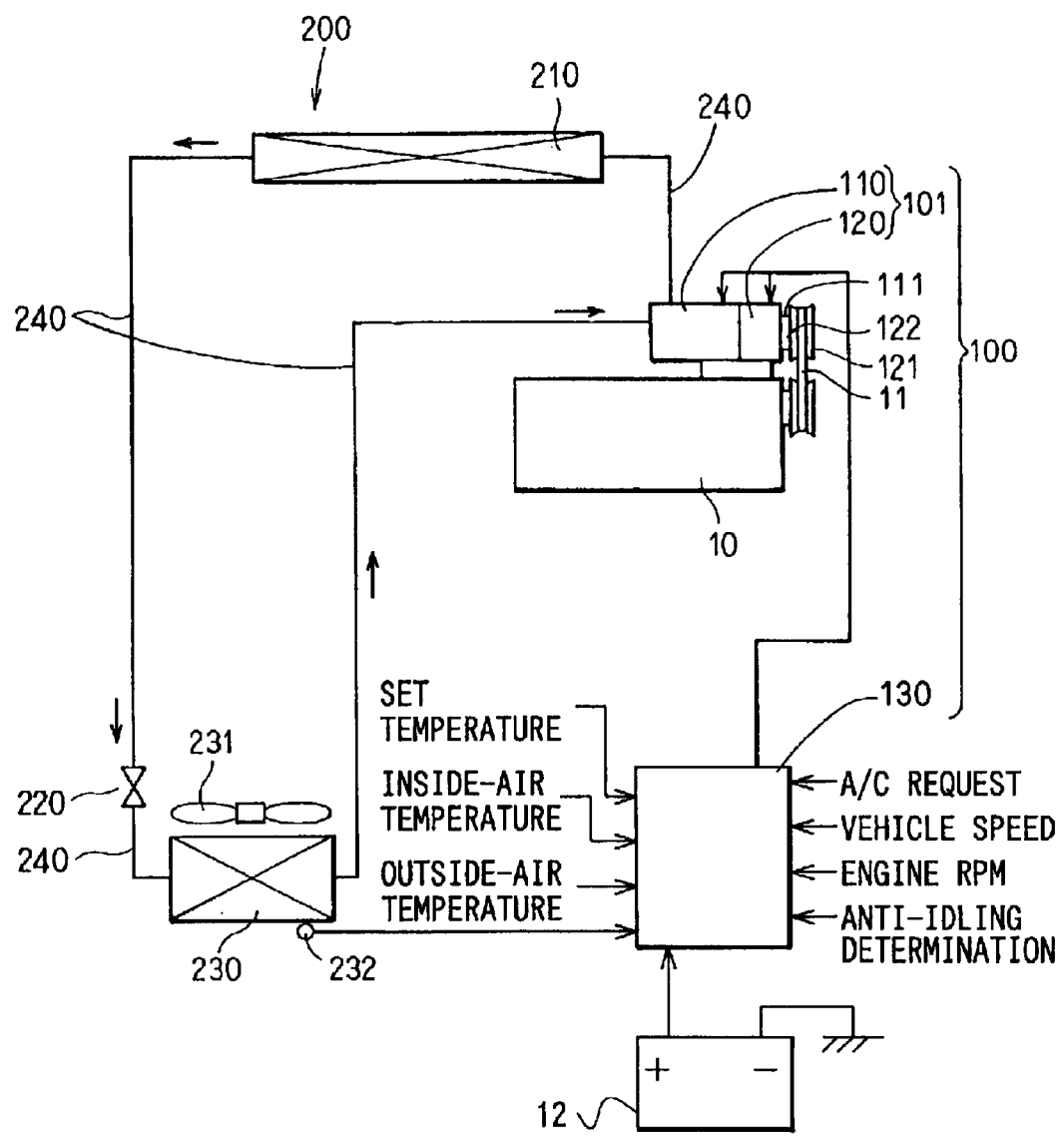
FIG. 1 is a schematic diagram illustrating a refrigeration circuit that includes a compressor according to the present invention.

A first embodiment of the present invention is shown in FIGS. 1 to 4. In this embodiment, a hybrid compressor 101 is shown that integrates a compressor 110 and a motor 120. The hybrid compressor 101 and a controller 130 form a controlled compressor apparatus 100. The compressor 110 is part of a refrigeration circuit 200 in a vehicle air conditioning system.

The vehicle of interest in this embodiment is a so-called idle-stop vehicle, in which the engine 10 stops during running when temporarily at rest, at a stoplight or the like. While the vehicle is running, operating the refrigeration circuit 200 causes the compressor 110 to be powered by the engine 10 via a belt 11. On the other hand, while the vehicle is at rest, stopping the engine causes the compressor 110 to be powered by the motor 120 driven by a battery 12.

The refrigeration circuit 200 is operated with a known refrigeration cycle, and the compressor 110 provides compressed high-temperature and high-pressure refrigerant in the refrigeration cycle. A refrigerant conduit 240 is formed from the compressor 110 through a condenser 210 and an expansion valve 220 to an evaporator 230. The condenser 210 condenses and liquefies the compressed refrigerant, the expansion valve 220 adiabatically expands the liquefied refrigerant, and the evaporator 230 evaporates the expanded refrigerant to cool the air delivered from an air blower 231 in a well-known manner.

Additionally, downstream of the evaporator 230, there is a temperature sensor 232, serving as temperature sensing means, for sensing the temperature of the cooled air (hereinafter referred to as an evaporator temperature). In this embodiment, the evaporator temperature is used to determine whether the motor 120 is turned on or off, as described later. On the other hand, this determinant may be replaced with the temperature at an inlet through which the air cooled by the evaporator 230 is discharged into the cabin of the vehicle, at a point inside the cabin, at a point outside the vehicle or the like.

The hybrid compressor 101 is a known swash-plate variable-volume compressor in this embodiment. The discharge volume per revolution is varied by the controller 130. The compressor 110 is also provided with a control valve (not shown), the degree of opening of which is varied to change the angle of inclination of the swash plate, which regulates the displacement. More specifically, the angle of inclination of the swash plate is decreased to cause the pistons to have a shorter stroke in the compression chamber, thereby reducing the discharge volume. On the contrary, the angle of inclination of the swash plate may be increased to cause the pistons to have a larger stroke in the compression chamber, thereby increasing the discharge volume. A resilient member acts on the swash plate to minimize its angle of inclination (to provide a substantially zero discharge volume) while the compressor 110 is not in operation.

The motor 120 is driven when powered by the battery 12. One end of the motor shaft 111 is coupled to the compressor 110. The shaft 111 is also coupled to a pulley 121 through a one-way clutch 122. The pulley 121 is coupled to the engine 10 with the belt 11.

When the engine 10 is in operation, the one-way clutch 122 couples the pulley 121 to the shaft 111 to transmit the driving force of the engine 10 to the shaft 111, which operates the compressor 110. When the engine 10 is stopped, the motor 120 rotates in the same direction as the engine 10 to disengage the one-way clutch 122, thereby allowing the compressor 110 to be operated without being affected by the pulley 121.

The controller 130 is adapted to control the operation of the hybrid compressor 101 and receive signals representing things such as the speed of the vehicle, from an engine controller (not shown), the engine speed (rpm), an idle-stop determinant signal, and an air conditioning request signal. The controller 130 also receives signals such as a signal representing the cabin temperature setting, an evaporator temperature, from the temperature sensor 232, the temperature of air inside the cabin, and the temperature of air outside the vehicle.

Figure 2:
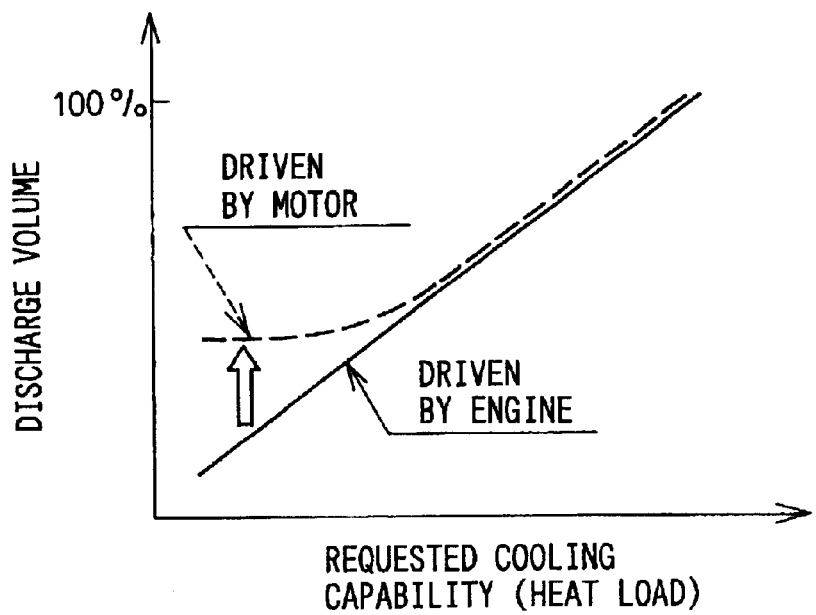
FIG. 2 is a control characteristic diagram illustrating the relationship between the discharge volume and the cooling capability required of the refrigeration circuit, with the engine and the motor providing an equivalent maximum discharge volume.

As shown in FIG. 2, pre-stored in the controller 130 is the control characteristic of the discharge volume of the compressor 110 versus the cooling capability (or a heat load) required of the refrigeration circuit 200. Accordingly, the controller 130 mainly determines the discharge volume according to the required cooling capability, which is calculated mainly by the aforementioned various temperature signals. Thus, the degree of valve opening of the aforementioned control valve and the angle of inclination of the swash plate in the compressor 110 are adjusted to provide the determined discharge volume.

These basic settings in the control characteristics are provided such that the discharge volume is decreased as the required cooling capability is reduced. What this means is, for example, that the discharge volume is decreased as the cabin is continuously cooled after the refrigeration circuit 200 has been activated or that a lower discharge volume is provided when the temperature of air outside the vehicle is lower during spring, autumn, and winter with respect to summer through a year.

In the case where the engine 10 drives the compressor 110, as shown by the solid line in FIG. 2, the discharge volume is decreased as the required cooling capability is reduced, to conform to the aforementioned basic setting pattern. However, in the case where the motor 120 drives the compressor 110, as shown by the dashed line in FIG. 2, the discharge volume is larger than that indicated by the solid line, mainly in the region of lower required cooling capability.

Additionally, the discharge volume may be determined according to the motor efficiency ηm of the motor 120 and the compressor efficiency ηc of the compressor 110. In other words, the discharge volume is preferably determined such that the product of both the efficiencies (71 m·ηc) is large as possible among the possible discharge volume values.

Figure 3:
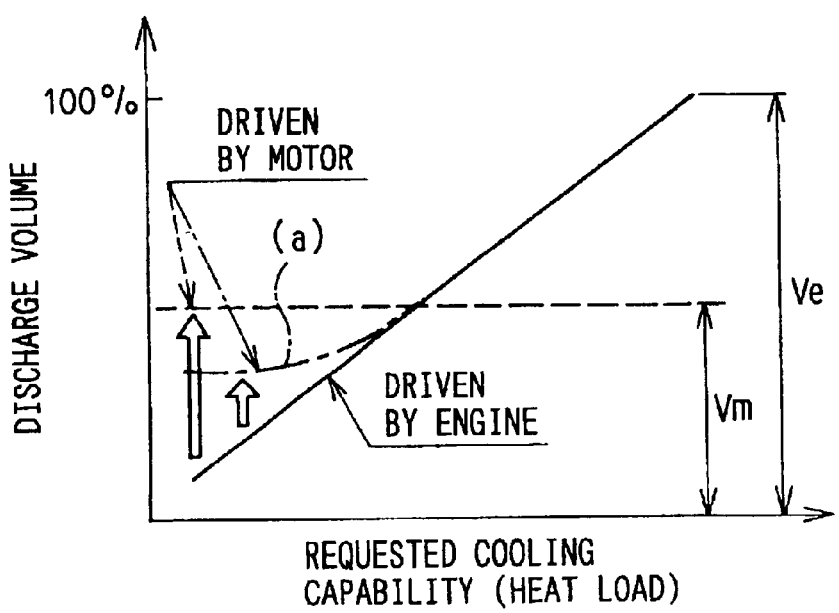
FIG. 3 is a control characteristic diagram illustrating the relationship between the discharge volume and the cooling capability required of the refrigeration circuit, with the engine providing a less maximum discharge volume than the motor.

It may happen that the capacity of the motor is set, to avoid making the motor 120 too large, by permitting some degradation in cooling performance, in consideration of the fact that the motor 120 is to function only during idling operations. In this situation, the setting is performed such that the maximum discharge volume Vm provided by the compressor 110 when driven by the motor 120 is less than (e.g., generally half) the maximum discharge volume Ve provided by the compressor 110 when driven by the engine 10. In such a case, as shown in FIG. 3, the discharge volume may be set larger than that corresponding to the required cooling capability (indicated by the solid line) mainly in the region of lower cooling capabilities in the range (of Vm) that can be varied using the motor 120. That is, consider the region where the discharge volume, when the compressor is driven by the engine, as shown by the solid line, is lower than the maximum discharge volume Vm provided when the motor 120 drives the compressor. In this region, the discharge volume may be set as shown by the alternate long and short dashed line (a) in FIG. 3 or according to the unchanged value of the maximum motor-driven discharge volume Vm.

The controller 130 turns the motor 120 on or off in accordance with the evaporator temperature provided by the temperature sensor 232. For on or off actuation, an upper limit Te1 and a lower limit Te2 are pre-set, such that the motor 120 is turned on when the evaporator temperature exceeds the upper limit Te1 and turned off when the evaporator temperature is lower than the lower limit Te2.

As a basic operation, when the air conditioner is in operation while the vehicle is running, the compressor 110 is driven by the engine 10. At this time, the controller 130 controls the degree of valve opening of the control valve in the compressor 110 to adjust the discharge volume (indicated by the solid line in FIG. 2) to the required cooling capability, thus compressing the refrigerant in the refrigeration circuit 200. On the other hand, consider a case where the evaporator temperature is equal to or below the predetermined determinant temperature (equal to below the lower limit Te2) or where the air conditioner is not in operation while the vehicle is running. In these cases, the discharge volume from the compressor 110 is minimized (to substantially zero) to create a low loading condition (substantially an idling condition), which places substantially no load on the engine 10.

Figure 4:
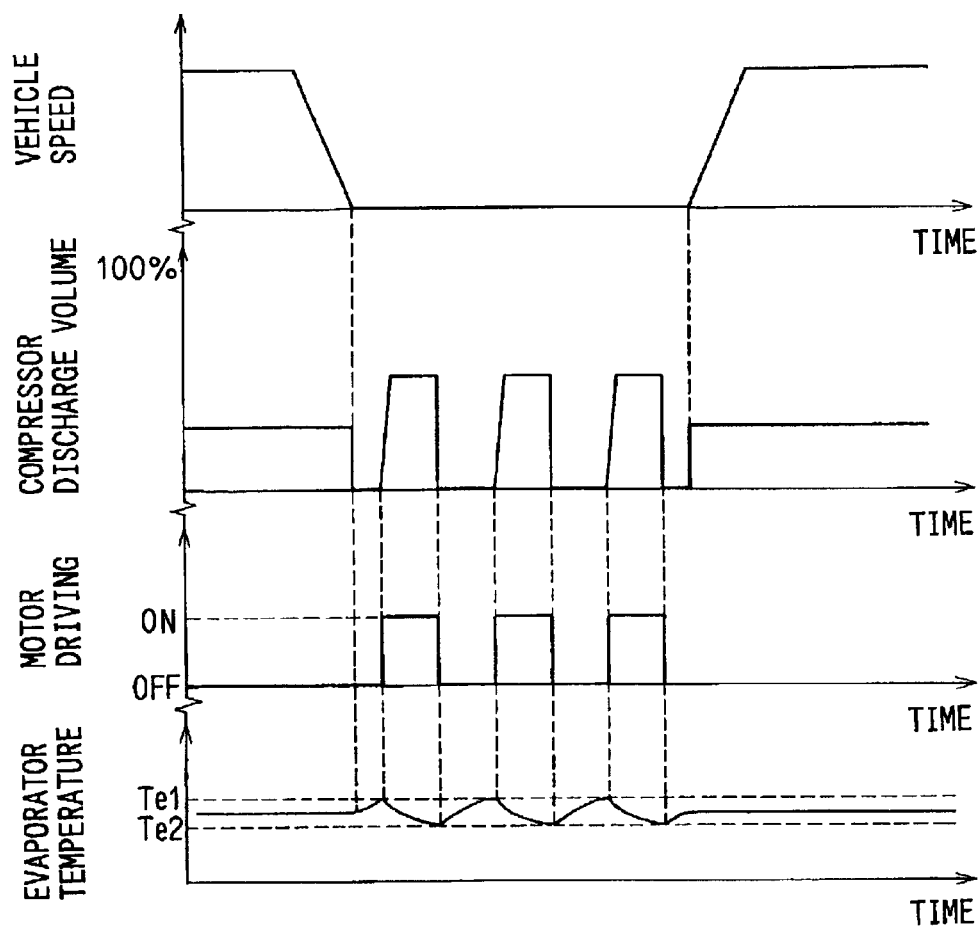
FIG. 4 is a time chart illustrating the control of the hybrid compressor.
Figure 6:
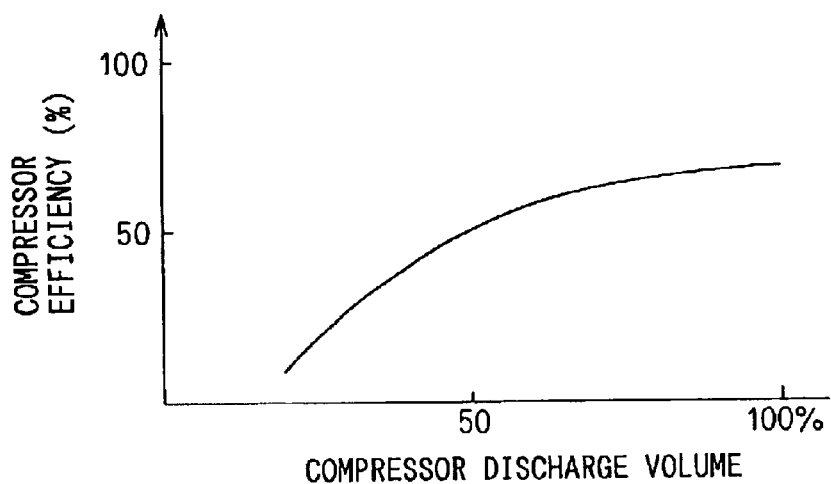
FIG. 6 is a graph showing the compression efficiency versus the discharge volume of a compressor according to the prior art.

This embodiment features the control provided for a vehicle at a standstill, which is described below in detail with reference to the time chart shown in FIG. 4. Initially, the motor 120 is at rest, and it is determined based on an air conditioning request signal that air conditioning is required. The vehicle is then brought to a standstill according to a vehicle speed signal. When it is determined according to the engine speed signal and the idle-stop determinant signal that the engine 10 is at rest, the motor 120 drives the compressor 110.

The motor 120 is operated (turned on) when the evaporator temperature exceeds the upper limit temperature Te1 after the engine 10 has stopped. At this time, the angle of inclination of the swash plate in the compressor 110 is varied by the force of the internal resilient member to cause the discharge volume to change from substantially zero to the amount shown by the dashed line shown in FIG. 2, thereby allowing the compressor 110 to operate. In particular, a relatively low cooling capability is required after the cabin has been sufficiently cooled or during spring, autumn, and winter, in which cases the compressor 110 operates to provide a larger discharge volume than that corresponding to the required cooling capability. When the evaporator temperature is lower than the lower limit Te2, the motor 120 and the compressor 110 are stopped (turned off). While the engine 10 is not in operation in the subsequent period of time, the aforementioned operations for turning on and off are repeated. Since the motor 120 starts at a discharge volume of substantially zero, as described above, no excessive starting current is generated.

When the engine 10 starts, for the vehicle to run again, the motor 120 is stopped, and the engine 10 drives the compressor 110.

In accordance with the foregoing configuration and operation described above, the action and effects according to this embodiment are described below. First, only the motor 120 drives the compressor 110 when the engine 10 is at rest, thereby ensuring the originally intended idle-stop to improve fuel efficiency.

When a low cooling capability is required, a larger discharge volume is provided than that corresponding to the required cooling capability. This makes it possible to operate the compressor 110 without decreasing the compressor efficiency ηc, which reduces the power consumption of the motor 120. At this time, the turning on and off operations can eliminate unnecessary operating time, thereby reducing the total power consumption.

Furthermore, the motor 120 is turned on and off in accordance with the evaporator temperature. This can be readily performed using a temperature signal provided by a temperature sensor provided in the refrigeration circuit 200. Thus, it is possible to maintain the minimum required cooling capability to provide cooling while the engine 10 is at rest, reducing the power consumption of the motor 120.

Additionally, control is provided to produce the discharge volume corresponding to the required cooling capability while the engine 10 is running. This makes it possible to take advantage of the merits of the variable volume type compressor 110 in eliminating shocks that might otherwise occur when the discharge volume is varied. That is, while the vehicle is running, the engine 10 drives the compressor 110, regardless of the motor 120, thereby eliminating the need for concern about power consumption. In general, high transmission efficiencies are achieved when a drive force is transmitted from the engine 10 to the compressor 110. Thus, it is much more advantageous to take advantage of the benefits of the variable volume compressor than to consider the compressor efficiency ηc of the compressor 110 alone.

Other Embodiments

Figure 5:
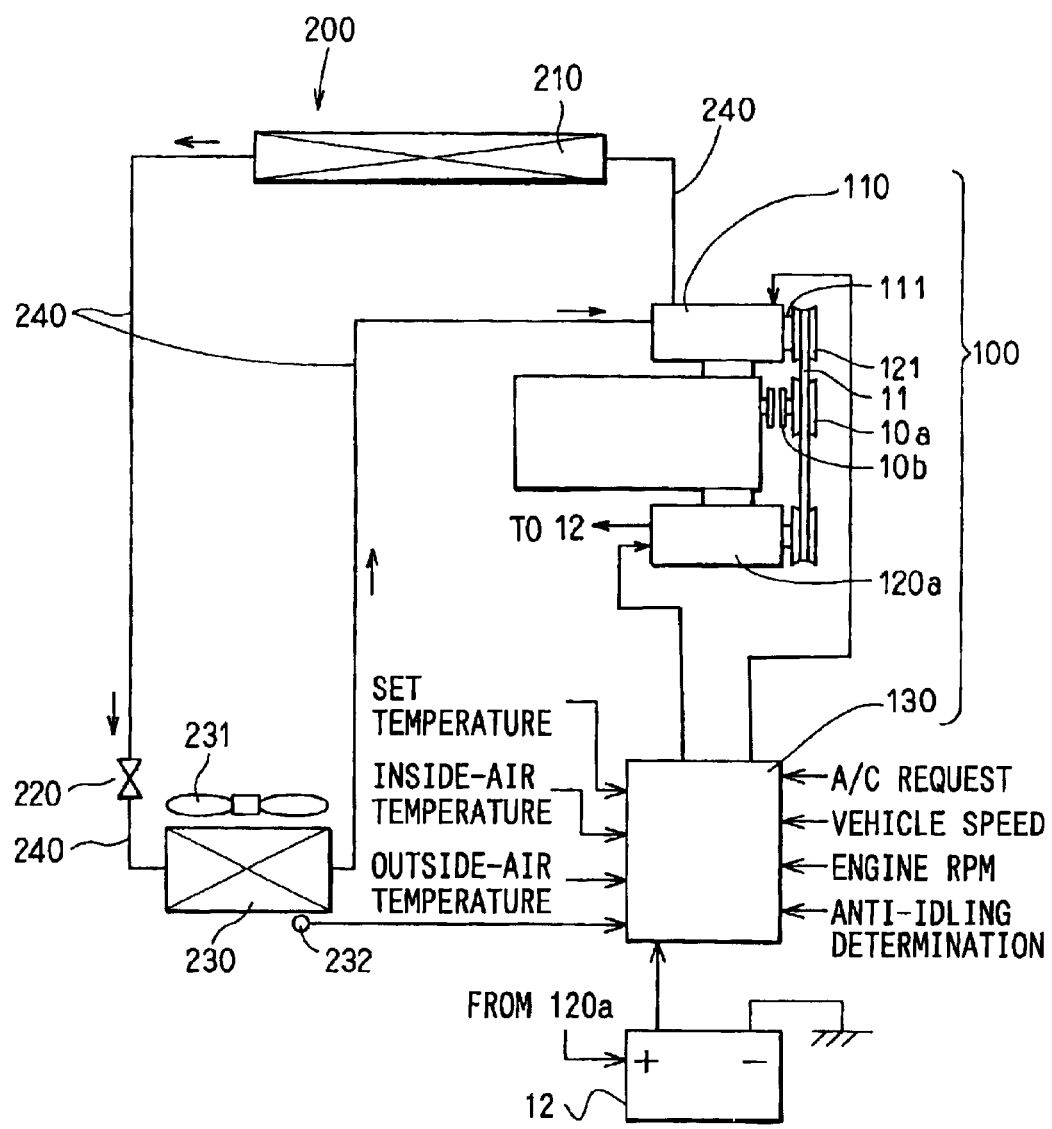
FIG. 5 is a schematic diagram illustrating a refrigeration circuit that includes a compressor according to a further embodiment of the present invention.

In the first embodiment, a hybrid compressor 101 has been described in which a compressor 110 and a motor 120 are integrally combined. However, as shown in FIG. 5, the hybrid compressor 101 maybe replaced with a single ordinary compressor 110. Accordingly, the motor 120 may be replaced with a motor generator 120a having a motor function and a generator function, and a pulley 10a of the engine 10 may be provided with a crankshaft clutch 10b. Like the first embodiment, the compressor 110 can be a swash-plate variable-volume compressor, the pulley 121 and the shaft 111 can be connected to each other without an intermediate clutch, and the compressor 110 can be selectively driven either by the engine 10 or the motor generator 120a. Thus, this embodiment has the same effects as the first embodiment.

Additionally, the compressor 110 has been described as a swash-plate variable-volume compressor; however, the present invention is not so limited and other compressors such as a through-vane or electrically varied volume compressor may be employed.

In addition, the clutch for engaging or disengaging the pulley 121 with or from the shaft 111, as described in the first embodiment is not limited to a one-way clutch 122 but may be replaced with an ordinary electromagnetic clutch.

Furthermore, instead of an idle-stop vehicle, the vehicle of interest may be a hybrid vehicle, the engine of which is stopped principally while running at low speeds and at rest, which provides the same effect.

What is claimed is:

1. A hybrid compressor apparatus for an engine-driven vehicle in which the engine is stopped when the vehicle temporarily stops while running, the compressor apparatus comprising:
   a variable volume type compressor, which is included in a refrigeration circuit;
   a motor, which is powered by a battery;
   a switching mechanism for causing the engine or the motor to drive the compressor;
   a controller for selecting either the engine or the motor to drive the compressor, for controlling the discharge volume of the compressor, and for selectively operating the motor to operate the compressor when the engine is at rest, wherein the controller causes the motor to operate the compressor such that the compressor is turned on or off at a discharge volume that is larger than a discharge volume corresponding to a necessary cooling ability for operating the refrigeration circuit by continuous compressor operation.

2. The hybrid compressor according to claim 1, wherein the on and off switching operations of the motor are carried out in accordance with the temperature at or near an evaporator in the refrigeration circuit, at or near an air inlet through which air that has been cooled by the evaporator is discharged into a cabin of the vehicle, inside the cabin, or outside the vehicle.

3. The hybrid compressor according to claim 2, wherein, while the engine is operating the compressor, the controller varies the discharge volume of the compressor to correspond with the discharge volume that is required for operating the refrigeration circuit by continuous compressor operation.

4. The hybrid compressor apparatus according to claim 3, wherein the compressor is integrated with the motor.

5. The hybrid compressor apparatus according to claim 2, wherein the compressor is integrated with the motor.

6. The hybrid compressor according to claim 1, wherein, while the engine is operating the compressor, the controller varies the discharge volume of the compressor to correspond with the discharge volume that is required for operating the refrigeration circuit by continuous compressor operation.

7. The hybrid compressor apparatus according to claim 6, wherein the compressor is integrated with the motor.

8. The hybrid compressor apparatus according to claim 1, wherein the compressor is integrated with the motor.

9. A hybrid compressor apparatus for an engine-driven, air-conditioned vehicle in which the engine is stopped when the vehicle temporarily stops while running, the compressor apparatus comprising:
   a refrigeration circuit;
   a variable volume type compressor in the refrigeration circuit, wherein the compressor is constructed to be driven by the engine if the engine is operating;
   a motor, which is powered by a battery, wherein the motor is constructed and arranged to selectively drive the compressor;
   a controller for selecting either the engine or the motor to drive the compressor, for controlling the discharge volume of the compressor, and for selectively operating the motor to operate the compressor when the engine is at rest, wherein the controller causes the motor to operate the compressor such that the compressor is turned on or off at a discharge volume that is larger than a discharge volume corresponding to a necessary cooling ability for operating the refrigeration circuit by continuous compressor operation.

10. The hybrid compressor according to claim 9, wherein, while the engine is operating the compressor, the controller varies the discharge volume of the compressor to correspond with the discharge volume that is required for operating the refrigeration circuit by continuous compressor operation according to the cooling load on the refrigeration circuit.

11. The hybrid compressor apparatus according to claim 9, wherein the compressor is integrated with the motor.

12. The hybrid compressor apparatus according to claim 1, wherein the discharge volume of the compressor is substantially zero when the motor is turned on.

13. The hybrid compressor apparatus according to claim 9, wherein the discharge volume of the compressor is substantially zero when the motor is turned on.

14. A hybrid compressor apparatus for an engine-driven vehicle in which the engine is stopped when the vehicle temporarily stops while running, the compressor apparatus comprising:
   a variable volume type compressor, which is included in a refrigeration circuit;
   a motor, which is powered by a battery;
   a switching mechanism for causing one of the engine or the motor to drive the compressor;
   a controller for:
      causing the switching mechanism to select either the engine or the motor to drive the compressor;
      controlling the discharge volume of the compressor; and while the engine is at rest, operating the motor to drive the compressor when the controller determines that, according to the temperature of a certain location, cooling is required, and stopping the motor when the controller determines that, according to the temperature of the certain location, cooling is no longer required, wherein, for a given cooling load, when the compressor is operated, the controller causes the motor to operate the compressor at a discharge volume that is greater than a discharge volume that would be required if the compressor were being operated continuously, so that the compressor, while operating, provides more cooling than is required for the given cooling load and is operated only intermittently to meet the given cooling load.

15. The hybrid compressor according to claim 14, wherein the motor is switched on and off in accordance with the temperature at or near an evaporator in the refrigeration circuit, at or near an air inlet through which air that has been cooled by the evaporator is discharged into a cabin of the vehicle, inside the cabin, or outside the vehicle.

16. The hybrid compressor according to claim 15, wherein, while the engine is operating the compressor, the controller varies the discharge volume of the compressor to correspond with the discharge volume that is required for operating the refrigeration circuit by continuous compressor operation.

17. The hybrid compressor apparatus according to claim 15, wherein the compressor is integrated with the motor.

18. The hybrid compressor apparatus according to claim 14, wherein the discharge volume of the compressor is substantially zero when the motor is turned on.

19. The hybrid compressor according to claim 14, wherein, while the engine is operating the compressor, the controller varies the discharge volume of the compressor to correspond with the discharge volume that is required for operating the refrigeration circuit by continuous compressor operation.

20. The hybrid compressor apparatus according to claim 14, wherein the compressor is integrated with the motor.

* * * * *